(12) United States Patent
Hashimoto

(10) Patent No.: US 9,798,116 B2
(45) Date of Patent: Oct. 24, 2017

(54) IMAGING LENS COMPOSED OF SIX OPTICAL ELEMENTS

(71) Applicant: KANTATSU CO., LTD., Yaita-shi, Tochigi (JP)

(72) Inventor: Masaya Hashimoto, Sukagawa (JP)

(73) Assignee: KANTATSU., LTD., Yaita (JP)

( * ) Notice: Subject to any disclaimer, the term of this patent is extended or adjusted under 35 U.S.C. 154(b) by 440 days.

(21) Appl. No.: 14/686,935

(22) Filed: Apr. 15, 2015

(65) Prior Publication Data

US 2015/0323765 A1 Nov. 12, 2015

(30) Foreign Application Priority Data

May 8, 2014 (JP) ................................ 2014-096645

(51) Int. Cl.
*G02B 13/00* (2006.01)
*G02B 13/04* (2006.01)
*G02B 9/62* (2006.01)

(52) U.S. Cl.
CPC ............... *G02B 13/04* (2013.01); *G02B 9/62* (2013.01); *G02B 13/0045* (2013.01); *G02B 13/0055* (2013.01)

(58) Field of Classification Search
CPC ...... G02B 13/04; G02B 9/62; G02B 13/0045; G02B 13/0065
USPC ................................................. 359/713, 714
See application file for complete search history.

(56) References Cited

U.S. PATENT DOCUMENTS

| 9,442,271 | B2 * | 9/2016 | You | G02B 13/0045 |
| 2013/0002920 | A1 * | 1/2013 | Sano | G02B 13/0045 348/311 |
| 2015/0226941 | A1 * | 8/2015 | Fukaya | G02B 13/0045 359/708 |
| 2015/0362701 | A1 * | 12/2015 | Hsu | G02B 13/00 359/757 |
| 2016/0231537 | A1 * | 8/2016 | Kubota | G02B 13/0045 |

FOREIGN PATENT DOCUMENTS

| JP | 2010-26434 A | 2/2010 |
| JP | 2011-85733 A | 4/2011 |

* cited by examiner

*Primary Examiner* — Bumsuk Won
*Assistant Examiner* — Grant Gagnon
(74) *Attorney, Agent, or Firm* — Oliff PLC

(57) ABSTRACT

A compact low-profile low-cost imaging lens with an F-value of 2.4 or less which offers a wide field of view and corrects aberrations properly. It includes elements arranged from an object side: a first positive lens having a convex surface on the object side as a first optical element; a second negative lens having a concave surface on an image side as a second optical element; a third positive lens as a third optical element; a fourth negative lens as a double-sided aspheric lens having a convex surface on the image side as a fourth optical element; and a fifth lens as a double-sided aspheric lens having a concave surface on the image side as a fifth optical element. As a sixth optical element, one aberration correction optical element as a double-sided aspheric element with virtually no refractive power is located between the first lens and the image plane.

24 Claims, 12 Drawing Sheets

IMAGING LENS COMPOSED OF SIX OPTICAL ELEMENTS

The present application is based on and claims priority of Japanese patent application No. 2014-096645 filed on May 8, 2014, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact image pickup device, and more particularly to an imaging lens composed of six optical elements which is built in an image pickup device mounted in an increasingly compact and low-profile smartphone, mobile phone, PDA (Personal Digital Assistant), game console, information terminal such as a PC, or home appliance with a camera function.

In the present invention, whether or not an optical element is a lens depends on whether or not it has refractive power on an optical axis. An optical element having refractive power on the optical axis is called a lens. An optical element which does not have a lens function can contribute to improvement of aberrations in the peripheral area of an image without changing the overall focal length. In terms of lens surface shape, a convex surface or a concave surface means that the paraxial portion of the surface (the portion near the optical axis) is convex or concave. A "pole-change point" on an aspheric surface means a point on the aspheric surface at which a tangential plane intersects the optical axis perpendicularly.

Description of the Related Art

In recent years, there has been a general tendency that many information terminals have a camera function. Also, home appliances with a camera have been introduced into the market. For example, a user who is away from home can see in real time what is going on at home through the camera mounted in a home appliance by telecommunication between the home appliance and his/her smartphone and can control the various functions of the home appliance on the smartphone. This kind of home appliance is called a smart home appliance and various smart home appliances such as smart cleaners, smart air conditioners, and smart refrigerators have become widely used. On the other hand, glasses or wrist watches with a camera function as products called wearable terminals have appeared in the market. A variety of high value-added products with a function which has been inconceivable in the past are being developed by adding a camera function to existing products, and it seems that products which enhance consumer convenience or consumer satisfaction in this way will be increasingly developed in the future. The cameras mounted in such products are required not only to provide high resolution to cope with an increase in the number of pixels but also to be compact and low-profile and offer high brightness and a wide field of view. For example, for use in mobile terminals, the imaging lenses are strongly expected to be low-profile and offer high resolution and high brightness. On the other hand, for use in various home appliances, the imaging lenses are strongly expected not only to meet these expectations but also to offer a sufficiently wide field of view to capture an image of an object over a wide field of view.

However, in order to provide a low-profile imaging lens with high brightness and a wide field of view as described above, the problem related to correction of aberrations in the peripheral area of an image has to be addressed and unless the problem is addressed, it is difficult to deliver high imaging performance throughout the image.

Conventionally, for example, the imaging lenses described in JP-A-2010-026434 (Patent Document 1) and JP-A-2011-085733 (Patent Document 2) are known as compact high-resolution imaging lenses.

Patent Document 1 discloses a compact imaging lens composed of five constituent lenses in which a first positive lens, a second positive lens, a third negative lens, a fourth positive lens, and a fifth negative lens are arranged in order from an object side. The imaging lens offers brightness with an F-value of about 2 and corrects various aberrations properly.

Patent Document 2 discloses an imaging lens which includes a first lens group including a first lens having a convex surface on an object side, a second lens group including a second lens having a concave surface on an image side, a third lens group including a third meniscus lens having a concave surface on the object side, a fourth lens group including a fourth meniscus lens having a concave surface on the object side, and a fifth lens group including a fifth meniscus lens having an aspheric surface with an inflection point on the object side. This configuration is intended to provide a compact high resolution imaging lens system.

The imaging lens described in Patent Document 1, composed of five constituent lenses, corrects various aberrations properly and offers high brightness with an F-value of about 2.0 to about 2.5. However, its total track length is longer than the diagonal length of the effective imaging plane of the image sensor, which is disadvantageous in making the imaging lens low-profile. Furthermore, since its focal length is relatively long and its field of view is about 62 degrees, in order for this configuration to offer a field of view of 70 degrees or more, it is necessary to address the problem related to correction of aberrations in the peripheral area of the image.

The imaging lens described in Patent Document 2 is a relatively low-profile lens system which corrects aberrations properly. However, its F-value is 2.8 and its field of view is up to 66 degrees or so. In order for this configuration to offer brightness with an F-value of 2.4 or less and a field of view of 70 degrees or more, again it is necessary to address the problem related to correction of aberrations in the peripheral area of the image.

As mentioned above, in the conventional art, it is difficult to provide a low-profile high-resolution imaging lens which offers high brightness and a wide field of view.

SUMMARY OF THE INVENTION

The present invention has been made in view of the above problem, and an object thereof is to provide a compact low-cost imaging lens which meets the demand for low-profileness even with an increase in the number of elements, offers brightness with an F-value of 2.4 or less and a wide field of view and corrects various aberrations properly.

Here, "low-profile" implies that the total track length is shorter than the diagonal length of the effective imaging plane of the image sensor and "wide field of view" implies that the field of view is 70 degrees or more. The diagonal length of the effective imaging plane of the image sensor is considered equal to the diameter of an effective imaging circle whose radius is the vertical height from an optical axis to the point where a light ray incident on the imaging lens at a maximum field of view enters the image plane, that is, the maximum image height.

According to an aspect of the present invention, there is provided an imaging lens composed of six optical elements which forms an image of an object on a solid-state image sensor, in which the elements are arranged in order from an object side to an image side as follows: a first lens with positive refractive power having a convex surface on the object side as a first optical element; a second lens with negative refractive power having a concave surface on the image side as a second optical element; a third lens with positive refractive power as a third optical element; a fourth lens with negative refractive power as a double-sided aspheric lens having a convex surface on the image side as a fourth optical element; and a fifth lens as a double-sided aspheric lens having a concave surface on the image side as a fifth optical element. As a sixth optical element, one aberration correction optical element as a double-sided aspheric element which has virtually no refractive power is located between the first lens and an image plane.

In the imaging lens composed of six optical elements with the above configuration, the positive, the negative, the positive, and the negative refractive power are arranged in order from the object side to enhance the telephoto capability and achieve low-profileness.

In the imaging lens composed of six optical elements with the above configuration, the first lens has strong refractive power to achieve low-profileness, the second lens corrects spherical aberrations and chromatic aberrations properly, and the third lens ensures low-profileness and corrects astigmatism and field curvature. The fourth lens, a double-sided aspheric lens with negative refractive power having a convex surface on the image side, corrects spherical aberrations which occur on the third lens and also corrects field curvature properly. The fifth lens, a lens with positive or negative refractive power having a concave surface on the image side, mainly corrects field curvature and distortion in the peripheral area using the aspheric surfaces on the both sides. In addition to the above five constituent lenses with refractive power, one aberration correction optical element with virtually no refractive power as the sixth optical element is located somewhere between the first lens and the image plane, so that aberrations in the peripheral area of the image are corrected properly.

Since the aberration correction optical element with virtually no refractive power as the sixth optical element has a parallel plate shape near the optical axis, it influences neither the refractive power of the overall optical system of the imaging lens, nor the refractive power of each of constituent lens. Therefore, it is effective in improving aberrations only in the peripheral area without changing the focal length of the optical system.

Since the aberration correction optical element with virtually no refractive power as the sixth optical element is located somewhere between the first lens and the image plane, using the aspheric surfaces on the both sides it can properly correct, particularly aberrations in the peripheral area which occur on an optical element located nearer to the object than the aberration correction optical element, so that aberrations of rays over a wide field of view are improved effectively.

Preferably, the imaging lens composed of six optical elements with the above configuration satisfies conditional expressions (1) to (3) below:

$$0.05 < TN/f < 0.5 \tag{1}$$

$$0.03 < dN/f < 0.1 \tag{2}$$

$$40 < vdN < 70 \tag{3}$$

where
TN: distance on the optical axis between lenses where the aberration correction optical element is located,
dN: thickness of the aberration correction optical element on the optical axis,
f: focal length of the overall optical system of the imaging lens, and
vdN: Abbe number of the aberration correction optical element at d-ray.

The conditional expression (1) defines an appropriate range for the distance of the space where the aberration correction optical element with virtually no refractive power is located, and indicates a condition to achieve low-profileness and correct aberrations. If the value is above the upper limit of the conditional expression (1), the distance between lenses where the aberration correction optical element is located would be too large to achieve low-profileness. On the other hand, if the value is below the lower limit of the conditional expression (1), the space for the aberration correction optical element would be too small, which might impose a restriction on the peripheral shape of the aberration correction optical element and make it impossible to make an appropriate aspheric shape. As a consequence, the aberration correction optical element might fail to fulfill its aberration correction function. If the aberration correction optical element is located between the fifth lens and the image plane, the "distance on the optical axis between lenses where the aberration correction optical element is located" in the conditional expression (1) means the distance on the optical axis between the image-side surface of the fifth lens and the image plane.

The conditional expression (2) defines an appropriate range for the ratio of the thickness of the aberration correction optical element with virtually no refractive power on the optical axis to the focal length of the overall optical system. When the conditional expression (2) is satisfied, the aberration correction optical element has an appropriate thickness to ensure low-profileness and fulfill its function to correct off-axial aberrations.

The conditional expression (3) defines an appropriate range for the Abbe number of the material of the aberration correction optical element with virtually no refractive power. When a material which satisfies the conditional expression (3), that is, a low-dispersion material, is adopted, aberrations in the peripheral area are corrected easily. Also, the range of Abbe number defined by the conditional expression (3) suggests that the aberration correction optical element can be made of inexpensive plastic material, so that the imaging lens can be manufactured at low cost.

In the imaging lens composed of six optical elements with the above configuration, preferably, the fifth lens is a meniscus lens having a concave surface on the image side which has the weakest positive or negative refractive power among the optical elements with refractive power and its object-side and image-side surfaces are aspheric surfaces with pole-change points off the optical axis. Since the fifth lens has the weakest refractive power, the manufacturing error sensitivity of the fifth lens is low and the manufacturing process is easier. In addition, since its aspheric surfaces have pole-change points, field curvature and distortion are corrected easily and the angle of rays incident on the image senor can be appropriately controlled.

Preferably, the imaging lens composed of six optical elements with the above configuration satisfies conditional expressions (4) and (5) below:

$$0.08 < T23/f < 0.2 \quad (4)$$

$$0.03 < d2/f < 0.08 \quad (5)$$

where

T23: air gap on the optical axis between the second lens and the third lens, d2: thickness of the second lens on the optical axis, and f: focal length of the overall optical system of the imaging lens.

The conditional expression (4) indicates a condition to optimize the air gap on the optical axis between the second lens and the third lens. If the value is above the upper limit of the conditional expression (4), the distance on the optical axis between the second lens and the third lens would be too large to achieve low-profileness. In that case, even if the aberration correction optical element is located between the second lens and the third lens, distortion and field curvature would increase, thus making it difficult to correct aberrations properly and deliver high imaging performance. On the other hand, if the value is below the lower limit of the conditional expression (4), the distance between the second lens and the third lens would be too small to obtain a sufficient ray height difference in an off-axial beam incident on the third lens, thus making it difficult to correct coma aberrations.

The conditional expression (5) indicates a condition to optimize the thickness of the second lens on the optical axis. If the value is above the upper limit of the conditional expression (5), the second lens would be too thick, which might make it necessary to increase the total track length in order to provide air gaps on the object side and the image side of the second lens. Also, in that case, if the aberration correction optical element is located between the first lens and the second lens, due to the space required for the aberration correction optical element it would be difficult to achieve low-profileness. On the other hand, if the value is below the lower limit of the conditional expression (5), it would be easy to provide air gaps on the object side and the image side of the second lens and provide the space required for the aberration correction optical element while ensuring low-profileness. However, the thickness of the second lens on the optical axis would be too small to ensure the formability of the second lens, resulting in manufacturing difficulty.

Preferably, the imaging lens composed of six optical elements with the above configuration satisfies a conditional expression (6) below:

$$1.0 < f12/f < 1.6 \quad (6)$$

where f12: composite focal length of the first lens and the second lens, and f: focal length of the overall optical system of the imaging lens.

The conditional expression (6) defines an appropriate range for the ratio of the positive composite focal length of the first lens and the second lens to the focal length of the overall optical system, and indicates a condition to achieve low-profileness and correct chromatic aberrations properly. If the value is above the upper limit of the conditional expression (6), the negative refractive power of the second lens would be relatively strong and thus it would be easier for the second lens to correct chromatic aberrations, but due to the relatively strong negative refractive power of the second lens, it would be difficult to achieve low-profileness. On the other hand, if the value is below the lower limit of the conditional expression (6), the refractive power of the first lens would be relatively strong and it would be easier to achieve low-profileness, but the negative refractive power of the second lens would be relatively weak and it would be difficult to correct chromatic aberrations.

Preferably, the imaging lens composed of six optical elements with the above configuration satisfies a conditional expression (7) below:

$$1.0 < f3/f < 2.0 \quad (7)$$

where f3: focal length of the third lens, and f: focal length of the overall optical system of the imaging lens.

The conditional expression (7) defines an appropriate range for the ratio of the focal length of the third lens to the focal length of the overall optical system, and indicates a condition to ensure low-profileness and correct spherical aberrations and coma aberrations properly. If the value is above the upper limit of the conditional expression (7), the positive refractive power of the third lens would be too weak to ensure low-profileness. On the other hand, if the value is below the lower limit of the conditional expression (7), the positive refractive power of the third lens would be too strong and spherical aberrations and coma aberrations would increase, so that it would be difficult to correct aberrations properly.

Preferably, the imaging lens composed of six optical elements with the above configuration satisfies a conditional expression (8) below:

$$-2.0 < f45/f < -1.2 \quad (8)$$

where f45: composite focal length of the fourth lens and the fifth lens, and f: focal length of the overall optical system of the imaging lens.

The conditional expression (8) defines an appropriate range for the ratio of the composite focal length of the fourth and fifth lenses to the focal length of the overall optical system, and indicates a condition to ensure low-profileness and correct chromatic aberrations properly. If the value is above the upper limit of the conditional expression (8), the composite negative refractive power of the fourth and fifth lenses would be too strong to ensure low-profileness though it would be advantageous in correcting chromatic aberrations. On the other hand, if the value is below the lower limit of the conditional expression (8), the composite negative refractive power of the fourth and fifth lenses would be too weak to correct chromatic aberrations properly.

Preferably, the imaging lens composed of six optical elements with the above configuration satisfies a conditional expression (9) below:

$$2.5 < (r3+r4)/(r3-r4) < 5.0 \quad (9)$$

where r3: curvature radius of the object-side surface of the second lens, and r4: curvature radius of the image-side surface of the second lens.

The conditional expression (9) defines an appropriate range for the ratio of the sum of the curvature radii of the object-side and image-side surfaces of the second lens to the difference between the curvature radii, which represents the paraxial shape of the second lens, and indicates a condition to correct various aberrations properly. When the conditional expression (9) is satisfied and the refractive power of the concave image-side surface of the second lens is increased, chromatic aberrations and off-axial coma aberrations, astigmatism and field curvature are corrected easily.

Preferably, the imaging lens composed of six optical elements with the above configuration satisfies conditional expressions (10) to (12) below:

$$20 < vd1 - vd2 < 40 \quad (10)$$

$$20 < vd4 - vd3 < 40 \quad (11)$$

$$40 < vd5 < 70 \quad (12)$$

where
vd1: Abbe number of the first lens at d-ray,
vd2: Abbe number of the second lens at d-ray,
vd3: Abbe number of the third lens at d-ray,
vd4: Abbe number of the fourth lens at d-ray, and
vd5: Abbe number of the fifth lens at d-ray.

The conditional expressions (10) to (12) define appropriate ranges for the Abbe numbers of the first to fifth lenses, and indicate conditions to correct chromatic aberrations properly. When the material of each of the constituent lenses satisfies the relevant conditional expression among the expressions (10) to (12), chromatic aberrations are corrected properly and easily. The ranges defined by these conditional expressions suggest that all the constituent lenses can be made of plastic material, so that it is easier to manufacture the imaging lens at low cost.

DETAILED DESCRIPTION OF THE PREFERRED EMBODIMENT

Hereinafter, the preferred embodiment of the present invention will be described in detail referring to the accompanying drawings. FIGS. 1, 3, 5, 7, 9, and 11 are schematic views showing the general configurations of the imaging lenses composed of six optical elements in Examples 1 to 6 according to this embodiment, respectively. Since all these examples have the same basic lens configuration, the general configuration of an imaging lens according to this embodiment is explained below mainly referring to the schematic view of Example 1.

Figure 1:
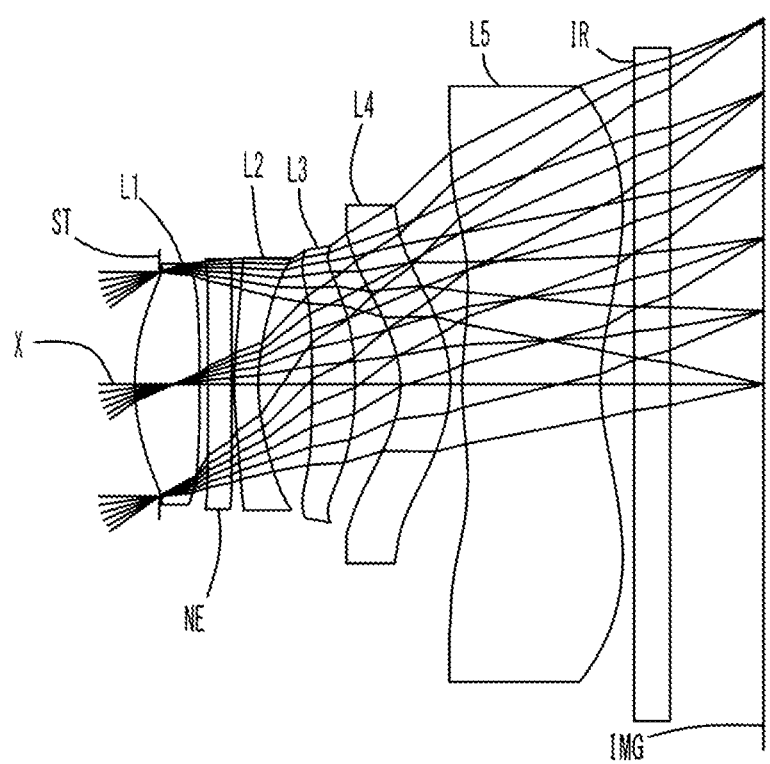
FIG. 1 is a schematic view showing the general configuration of an imaging lens in Numerical Example 1 according to an embodiment of the present invention.

As shown in FIG. 1, the imaging lens composed of six optical elements according to this embodiment includes, in order from an object side, a first positive lens L1 as a first optical element, a second negative lens L2 as a second optical element, a third positive lens L3 as a third optical element, a fourth negative lens L4 as a fourth optical element, and a fifth negative lens L5 as a fifth optical element. As a sixth optical element, an aberration correction optical element NE as a double-sided aspheric element which has virtually no refractive power is located between the first lens L1 and the second lens L2. Thus, the imaging lens according to this embodiment includes a total of six elements: five optical elements with refractive power and one aberration correction optical element with virtually no refractive power.

A filter IR such as an infrared cut filter is located between the fifth lens L5 and the image plane IMG. The filter IR is omissible. The values of total track length and back focus of the imaging lens according to this embodiment are defined as equivalent air distances for the filter IR. An aperture stop ST is located on the object side of the first lens L1.

In the imaging lens composed of six optical elements according to this embodiment, the first lens L1 to the fourth lens L4 have positive, negative, positive, and negative refractive power, respectively, making up a configuration which is advantageous in enhancing the telephoto capability and achieving low-profileness. The first lens L1 is a biconvex lens with strong refractive power to achieve low-profileness. The second lens L2 has a meniscus shape with a concave surface on the image side and corrects spherical aberrations and chromatic aberrations properly. The third lens L3 has a meniscus shape with a convex surface on the image side, and ensures low-profileness through its positive refractive power and corrects astigmatism and field curvature. The fourth lens L4 has a meniscus shape with a convex surface on the image side and corrects spherical aberrations which occur on the third lens L3 and also corrects field curvature properly using the aspheric surfaces on the both sides. The fifth lens L5 has a meniscus shape with a concave surface on the image side and mainly corrects field curvature and distortion in the peripheral area using the aspheric surfaces on the both sides. In addition to these five constituent lenses with refractive power, the aberration correction optical element NE with virtually no refractive power as the sixth optical element is located between the first lens L1 and the second lens L2 to properly correct aberrations which occur in the peripheral area.

Since the aberration correction optical element NE with virtually no refractive power as the sixth optical element has a parallel plate shape near an optical axis, it influences neither the refractive power of the overall optical system of the imaging lens, nor the refractive power of each of constituent lens from the first lens L1 to the fifth lens L5. Therefore, it corrects aberrations only in the peripheral area without changing parameters such as focal length and lens center thickness.

Since the aberration correction optical element NE with virtually no refractive power as the sixth optical element is located somewhere between the first lens L1 and the image plane IMG, using the aspheric surfaces on the both sides it properly corrects aberrations in the peripheral area, particularly aberrations which occur on a lens located nearer to the object than the aberration correction optical element NE. Therefore, it is effective in improving aberrations of rays over a wide field of view, so that it contributes to correcting aberrations in the peripheral area which increase as the field of view is wider and the F-value is lower.

Alternatively, the aberration correction optical element NE may be located between the second lens L2 and the third lens L3 as in Example 2, or between the third lens L3 and the fourth lens L4 as in Example 3, or between the fourth lens L4 and the fifth lens L5 as in Example 4, or between the fifth lens L5 and the image plane IMG as in Examples 5 and 6. In other words, when the aberration correction optical element NE is located between any two neighboring lenses, it properly corrects aberrations in the peripheral area which occur on a lens located nearer to the object than it.

The shape of the first lens L1 is not limited to a biconvex shape, but as in Examples 3 to 6, it may have a meniscus shape with a convex surface on the object side. The shape of the third lens L3 is not limited to a meniscus shape with a convex surface on the image side, but as in Example 2, it may have a biconvex shape. The refractive power of the fifth lens L5 is not limited to negative refractive power, but it may have positive refractive power if its refractive power is well balanced with the refractive power of the fourth lens L4 so that their composite refractive power is negative. The fifth lens L5 has positive refractive power in Examples 2 to 5.

The aperture stop ST is located on the object side of the first lens L1. Therefore, the exit pupil is remote from the image plane IMG, so that it is easy to ensure telecentricity.

When the imaging lens composed of six optical elements according to this embodiment satisfies conditional expressions (1) to (12) below, it brings about advantageous effects:

$$0.05 < TN/f < 0.5 \tag{1}$$

$$0.03 < dN/f < 0.1 \tag{2}$$

$$40 < vdN < 70 \tag{3}$$

$$0.08 < T23/f < 0.2 \tag{4}$$

$$0.03 < d2/f < 0.082 \tag{5}$$

$$1.0 < f12/f < 1.6 \tag{6}$$

$$1.0 < f3/f < 2.0 \tag{7}$$

$$-2.0 < f45/f < -1.2 \tag{8}$$

$$2.5 < (r3+r4)/(r3-r4) < 5.0 \tag{9}$$

$$20 < vd1-vd2 < 40 \tag{10}$$

$$20 < vd4-vd3 < 40 \tag{11}$$

$$40 < vd5 < 70 \tag{12}$$

where

TN: distance on the optical axis X between lenses where the aberration correction optical element NE is located, dN: thickness of the aberration correction optical element NE on the optical axis X, f: focal length of the overall optical system of the imaging lens, vdN: Abbe number of the aberration correction optical element NE at d-ray, T23: air gap on the optical axis X between the second lens L2 and the third lens L3, d2: thickness of the second lens L2 on the optical axis X, f12: composite focal length of the first lens L1 and second lens L2, f3: focal length of the third lens L3, f45: composite focal length of the fourth lens L4 and fifth lens L5, r3: curvature radius of the object-side surface of the second lens L2, r4: curvature radius of the image-side surface of the second lens L2, vd1: Abbe number of the first lens L1 at d-ray, vd2: Abbe number of the second lens L2 at d-ray, vd3: Abbe number of the third lens L3 at d-ray, vd4: Abbe number of the fourth lens L4 at d-ray, and vd5: Abbe number of the fifth lens L5 at d-ray.

When the imaging lens composed of six optical elements according to this embodiment satisfies conditional expressions (1a) to (12a) below, it brings about more advantageous effects:

$$0.05 < TN/f < 0.40 \tag{1a}$$

$$0.04 < dN/f < 0.08 \tag{2a}$$

$$45 < vdN < 65 \tag{3a}$$

$$0.09 < T23/f < 0.18 \tag{4a}$$

$$0.04 < d2/f < 0.06 \tag{5a}$$

$$1.0 < f12/f < 1.5 \tag{6a}$$

$$1.0 < f3/f < 1.6 \tag{7a}$$

$$-1.8 < f45/f < -1.5 \tag{8a}$$

$$2.5 < (r3+r4)/(r3-r4) < 4.8 \tag{9a}$$

$$25 < vd1-vd2 < 40 \tag{10a}$$

$$25 < vd4-vd3 < 40 \tag{11a}$$

$$45 < vd5 < 65. \tag{12a}$$

The signs in the above conditional expressions have the same meanings as those in the preceding paragraph.

When the imaging lens composed of six optical elements according to this embodiment satisfies conditional expressions (1b) to (12b) below, it brings about particularly advantageous effects:

$0.06 \leq TN/f \leq 0.35$ (1b)

$0.05 \leq dN/f \leq 0.07$ (2b)

$50 < vdN < 60$ (3b)

$0.10 \leq T23/f \leq 0.17$ (4b)

$0.05 \leq d2/f \leq 0.06$ (5b)

$1.13 \leq f12/f \leq 1.46$ (6b)

$1.19 \leq f3/f \leq 1.87$ (7b)

$-1.99 \leq f45/f \leq -1.38$ (8b)

$2.82 \leq (r3+r4)/(r3-r4) \leq 4.41$ (9b)

$28 < vd1-vd2 < 36$ (10b)

$28 < vd4-vd3 < 36$ (11b)

$50 < vd5 < 60.$ (12b)

The signs in the above conditional expressions have the same meanings as those in the preceding paragraph.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, TLA denotes a total track length (equivalent air distance for a filter IR), and bf denotes a back focus (equivalent air distance for a filter IR). i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

NUMERICAL EXAMPLE 1

The basic lens data of Numerical Example 1 is shown below.

| in mm |
|---|
| f = 4.25 |
| Fno = 2.3 |
| ω(°) = 35.4 |
| ih = 3.06 |
| TLA = 5.15 |
| bf = 1.26 |

| Surface Data | | | | |
|---|---|---|---|---|
| Surface No. i | Curvature Radius r | Surface Distance d | Refractive Index Nd | Abbe Number vd |
| (Object Surface) | Infinity | Infinity | | |
| 1 (Stop) | Infinity | −0.205 | | |
| 2* | 1.858 | 0.539 | 1.544 | 55.57 (vd1) |
| 3* | −90.000 | 0.071 | | |
| 4* | Infinity | 0.200 | 1.535 | 55.66 (vdN) |
| 5* | Infinity | 0.021 | | |
| 6* | 2.762 | 0.200 | 1.635 | 23.97 (vd2) |
| 7* | 1.568 | 0.449 | | |
| 8* | −49.915 | 0.363 | 1.544 | 55.57 (vd3) |
| 9* | −2.607 | 0.378 | | |
| 10* | −0.878 | 0.417 | 1.614 | 25.58 (vd4) |
| 11* | −1.196 | 0.100 | | |
| 12* | 2.778 | 1.157 | 1.544 | 55.57 (vd5) |
| 13* | 1.906 | 0.280 | | |
| 14 | Infinity | 0.300 | 1.563 | 51.30 |
| 15 | Infinity | 0.785 | | |
| Image Plane | Infinity | | | |

| Constituent Lens Data | | |
|---|---|---|
| Lens | Start Surface | Focal Length |
| 1 | 2 | 3.354 |
| 2 | 6 | −6.111 |
| 3 | 8 | 5.044 |
| 4 | 10 | −10.697 |
| 5 | 12 | −20.943 |

-continued in mm

Composite Focal Length

| Lens | |
|---|---|
| 1, 2 | 5.655 |
| 4, 5 | −5.872 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | −4.156E+01 | −1.068E+01 |
| A4 | −2.570E−02 | −8.669E−02 | 1.921E−03 | 5.299E−04 | −1.206E−01 | −1.362E−02 |
| A6 | 3.148E−02 | 8.816E−02 | −7.954E−03 | 1.051E−02 | 1.286E−01 | 3.824E−02 |
| A8 | −6.597E−02 | −8.687E−02 | −6.724E−03 | −6.687E−03 | 3.982E−02 | 1.350E−01 |
| A10 | −2.043E−02 | −2.255E−02 | −4.384E−04 | −1.264E−02 | −1.296E−01 | −2.363E−01 |
| A12 | 8.918E−02 | 4.768E−02 | 0.000E+00 | 0.000E+00 | 3.503E−02 | 1.510E−01 |
| A14 | −6.655E−02 | −2.451E−02 | 0.000E+00 | 0.000E+00 | 1.695E−02 | −2.738E−02 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 3.581E+00 | −3.899E+00 | −8.168E−01 | −2.476E+01 | −1.031E+01 |
| A4 | −1.076E−01 | −1.638E−02 | −5.435E−02 | 1.273E−01 | −1.233E−01 | −4.748E−02 |
| A6 | −3.004E−02 | −4.221E−02 | −1.490E−02 | −4.880E−02 | 6.750E−02 | 1.762E−02 |
| A8 | 3.611E−02 | 3.786E−02 | 1.137E−01 | 1.994E−02 | −4.172E−02 | −7.368E−03 |
| A10 | −6.063E−03 | 4.558E−02 | −4.709E−02 | 1.099E−02 | 2.106E−02 | 2.149E−03 |
| A12 | 1.702E−02 | −1.558E−03 | −5.391E−03 | −2.911E−03 | −5.895E−03 | −3.892E−04 |
| A14 | 6.292E−02 | 6.163E−04 | 3.333E−03 | −2.719E−03 | 8.248E−04 | 3.848E−05 |
| A16 | −4.209E−02 | 0.000E+00 | −1.655E−04 | 7.487E−04 | −4.592E−05 | −1.572E−06 |

In this example, the aberration correction optical element NE as a double-sided aspheric element with virtually no refractive power is located between the first lens L1 and the second lens L2.

As shown in Table 1, the imaging lens in Numerical Example 1 satisfies all the conditional expressions (1) to (12).

Figure 2:
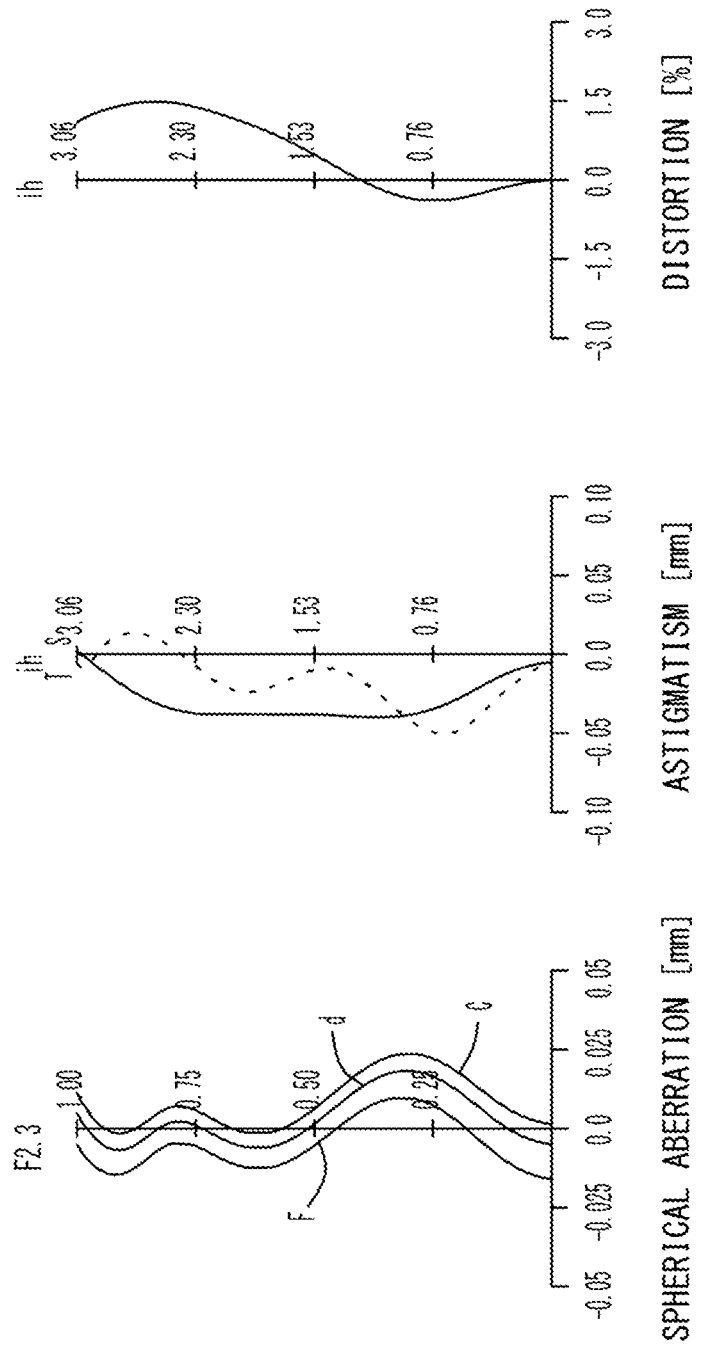
FIG. 2 shows spherical aberration, astigmatism, and distortion of the imaging lens in Numerical Example 1 according to the embodiment of the present invention.
Figure 3:
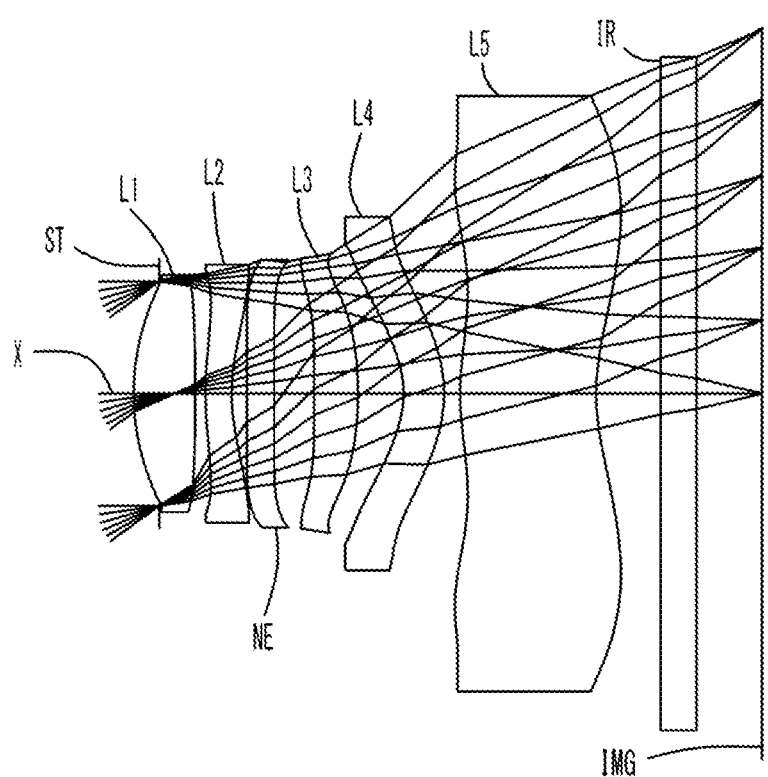
FIG. 3 is a schematic view showing the general configuration of an imaging lens in Numerical Example 2 according to the embodiment of the present invention.

FIG. 2 shows spherical aberration (mm), astigmatism (mm), and distortion (%) of the imaging lens in Numerical Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, and 12). As shown in FIG. 2, each aberration is corrected properly.

NUMERICAL EXAMPLE 2

The basic lens data of Numerical Example 2 is shown below.

in mm f = 4.17
Fno = 2.2
ω(°) = 36.0
ih = 3.06
TLA = 5.15
bf = 1.28

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.213 | | |
| 2* | 2.014 | 0.514 | 1.544 | 55.57 (vd1) |
| 3* | −37.346 | 0.085 | | |
| 4* | 2.559 | 0.220 | 1.639 | 23.23 (vd2) |
| 5* | 1.583 | 0.126 | | |
| 6* | Infinity | 0.228 | 1.535 | 55.66 (vdN) |
| 7* | Infinity | 0.334 | | |
| 8* | 88.859 | 0.367 | 1.544 | 55.57 (vd3) |
| 9* | −2.873 | 0.380 | | |
| 10* | −0.837 | 0.339 | 1.639 | 23.23 (vd4) |
| 11* | −1.177 | 0.135 | | |
| 12* | 2.208 | 1.135 | 1.544 | 55.57 (vd5) |

-continued

| in mm | | | | |
|---|---|---|---|---|
| 13* | 1.813 | 0.540 | | |
| 14 | Infinity | 0.300 | 1.517 | 64.20 |
| 15 | Infinity | 0.546 | | |
| Image Plane | Infinity | | | |

Constituent Lens Data

| Lens | Start Surface | Focal Length |
|---|---|---|
| 1 | 2 | 3.531 |
| 2 | 4 | −7.122 |
| 3 | 8 | 5.124 |
| 4 | 10 | −7.420 |
| 5 | 12 | 1709.609 |

Composite Focal Length

| Lens | |
|---|---|
| 1, 2 | 5.741 |
| 4, 5 | −6.105 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | −2.937E+01 | −9.649E+00 | 0.000E+00 | 0.000E+00 |
| A4 | 1.708E−03 | −7.268E−02 | −1.446E−01 | −5.982E−02 | −9.294E−03 | −1.454E−02 |
| A6 | 2.061E−02 | 1.205E−01 | 8.857E−02 | −2.712E−02 | 2.627E−02 | 4.235E−02 |
| A8 | −5.672E−02 | −9.474E−02 | 4.803E−02 | 1.415E−01 | 3.476E−02 | 2.168E−02 |
| A10 | −5.036E−03 | −1.517E−02 | −1.294E−01 | −2.241E−01 | 0.000E+00 | 0.000E+00 |
| A12 | 9.875E−02 | 5.516E−02 | 8.495E−03 | 1.327E−01 | 0.000E+00 | 0.000E+00 |
| A14 | −7.472E−02 | −4.466E−02 | 1.541E−02 | −2.451E−02 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 4.243E+00 | −3.919E+00 | −7.832E−01 | −2.014E+01 | −8.448E+00 |
| A4 | −1.185E−01 | −2.503E−02 | −5.027E−02 | 1.336E−01 | −1.277E−01 | −5.264E−02 |
| A6 | −4.313E−02 | −6.120E−02 | −1.626E−02 | −4.001E−02 | 6.972E−02 | 2.013E−02 |
| A8 | 3.789E−02 | 2.366E−02 | 1.052E−01 | 2.059E−02 | −4.182E−02 | −7.766E−03 |
| A10 | −2.964E−02 | 4.859E−02 | −4.351E−02 | 8.561E−03 | 2.102E−02 | 2.154E−03 |
| A12 | 2.574E−02 | 2.543E−03 | −4.569E−03 | −3.125E−03 | −5.891E−03 | −3.836E−04 |
| A14 | 7.214E−02 | −1.847E−03 | 2.486E−03 | −2.519E−03 | 8.238E−04 | 3.835E−05 |
| A16 | −4.822E−02 | 0.000E+00 | −3.554E−04 | 7.539E−04 | −4.561E−05 | −1.599E−06 |

In this example, the aberration correction optical element NE as a double-sided aspheric element with virtually no refractive power is located between the second lens L2 and the third lens L3.

As shown in Table 1, the imaging lens in Numerical Example 2 satisfies all the conditional expressions (1) to (12).

Figure 4:
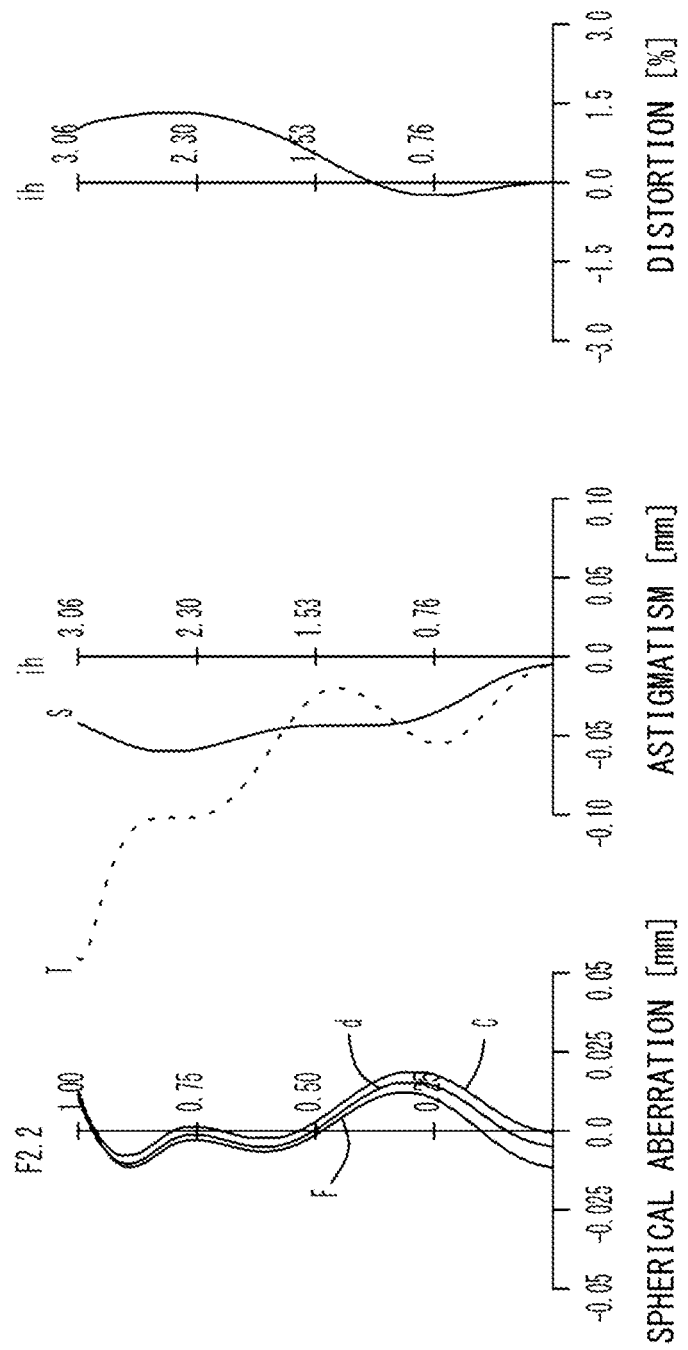
FIG. 4 shows spherical aberration, astigmatism, and distortion of the imaging lens in Numerical Example 2 according to the embodiment of the present invention.
Figure 5:
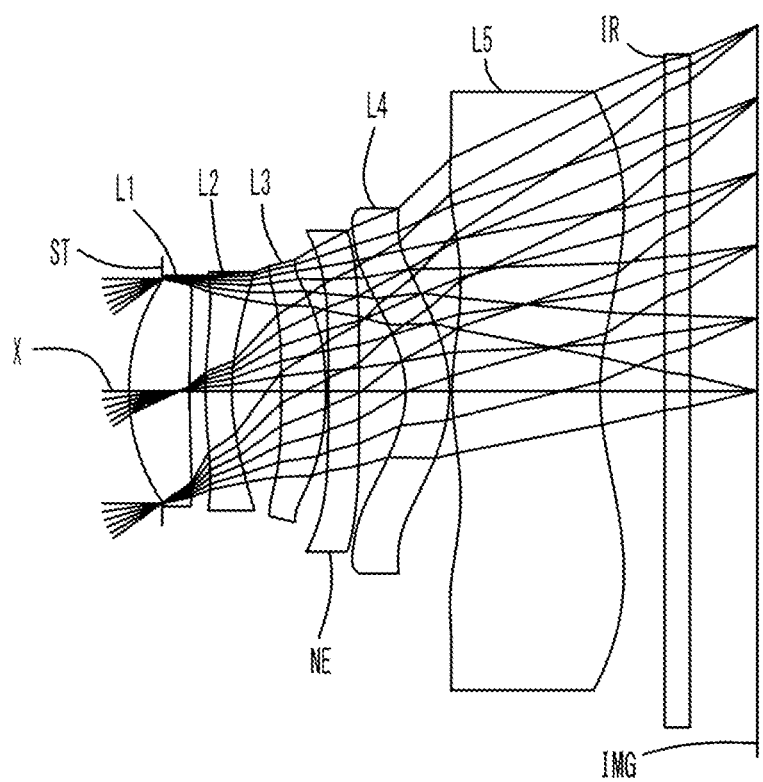
FIG. 5 is a schematic view showing the general configuration of an imaging lens in Numerical Example 3 according to the embodiment of the present invention.

FIG. 4 shows spherical aberration (mm), astigmatism (mm), and distortion (%) of the imaging lens in Numerical Example 2. As shown in FIG. 4, each aberration is corrected properly.

NUMERICAL EXAMPLE 3

The basic lens data of Numerical Example 3 is shown below.

| in mm |
|---|
| f = 4.15 |
| Fno = 2.2 |
| ω(°) = 36.0 |
| ih = 3.06 |
| TLA = 5.18 |
| bf = 1.24 |

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.276 | | |
| 2* | 1.718 | 0.507 | 1.544 | 55.57 (vd1) |
| 3* | 9.438 | 0.133 | | |

-continued

| in mm | | | | |
|---|---|---|---|---|
| 4* | 2.996 | 0.220 | 1.639 | 23.23 (vd2) |
| 5* | 1.801 | 0.415 | | |
| 6* | −13.134 | 0.372 | 1.544 | 55.57 (vd3) |
| 7* | −2.511 | 0.020 | | |
| 8* | Infinity | 0.259 | 1.535 | 55.66 (vdN) |
| 9* | Infinity | 0.390 | | |
| 10* | −0.847 | 0.364 | 1.639 | 23.23 (vd4) |
| 11* | −1.230 | 0.024 | | |
| 12* | 2.022 | 1.236 | 1.544 | 55.57 (vd5) |
| 13* | 1.955 | 0.540 | | |
| 14 | Infinity | 0.210 | 1.517 | 64.20 |
| 15 | Infinity | 0.561 | | |
| Image Plane | Infinity | | | |

Constituent Lens Data

| Lens | Start Surface | Focal Length |
|---|---|---|
| 1 | 2 | 3.774 |
| 2 | 4 | −7.614 |
| 3 | 6 | 5.640 |
| 4 | 10 | −6.774 |
| 5 | 12 | 19.715 |

Composite Focal Length

| Lens | |
|---|---|
| 1, 2 | 6.079 |
| 4, 5 | −8.258 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 1.532E+01 | −3.112E+01 | −1.038E+01 | 0.000E+00 | 3.428E+00 |
| A4 | 2.160E−03 | −7.454E−02 | −1.356E−01 | −1.860E−02 | −8.171E−02 | −2.431E−02 |
| A6 | 3.761E−02 | 1.085E−01 | 1.092E−01 | 1.024E−02 | −4.947E−02 | −5.037E−02 |
| A8 | −5.439E−02 | −8.601E−02 | 1.417E−02 | 1.288E−01 | 3.894E−02 | 2.458E−02 |
| A10 | −6.624E−03 | −1.322E−02 | −1.441E−01 | −2.425E−01 | −3.019E−03 | 4.834E−02 |
| A12 | 9.680E−02 | 4.563E−02 | 4.376E−02 | 1.564E−01 | 2.399E−02 | 4.622E−03 |
| A14 | −7.115E−02 | −3.629E−02 | 2.283E−02 | −2.795E−02 | 5.154E−02 | 6.046E−03 |
| A16 | 0.000E+00 | 0.000E+00 | 0.000E+00 | 0.000E+00 | −4.171E−02 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | −4.363E+00 | −7.103E−01 | −2.141E+01 | −8.826E+00 |
| A4 | −3.669E−02 | −3.058E−02 | −7.187E−02 | 1.087E−01 | −1.162E−01 | −4.764E−02 |
| A6 | −2.386E−02 | 5.094E−04 | −1.232E−02 | −3.615E−02 | 6.629E−02 | 1.807E−02 |
| A8 | 7.154E−03 | −2.151E−04 | 1.202E−01 | 2.303E−02 | −4.189E−02 | −7.454E−03 |
| A10 | 0.000E+00 | 0.000E+00 | −4.675E−02 | 9.586E−03 | 2.108E−02 | 2.165E−03 |
| A12 | 0.000E+00 | 0.000E+00 | −7.169E−03 | −3.120E−03 | −5.880E−03 | −3.877E−04 |
| A14 | 0.000E+00 | 0.000E+00 | 3.261E−03 | −2.651E−03 | 8.242E−04 | 3.801E−05 |
| A16 | 0.000E+00 | 0.000E+00 | 4.275E−04 | 7.816E−04 | −4.621E−05 | −1.548E−06 |

In this example, the aberration correction optical element NE as a double-sided aspheric element with virtually no refractive power is located between the third lens L3 and the fourth lens L4.

As shown in Table 1, the imaging lens in Numerical Example 3 satisfies all the conditional expressions (1) to (12).

Figure 6:
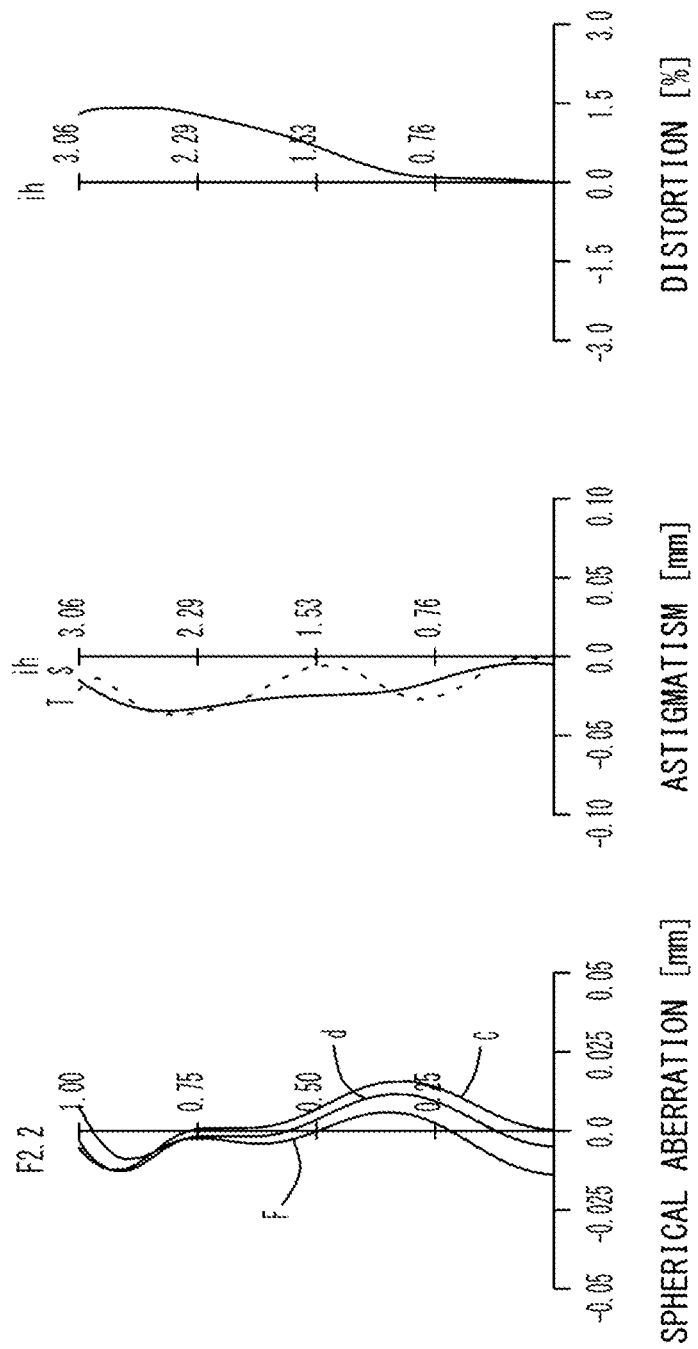
FIG. 6 shows spherical aberration, astigmatism, and distortion of the imaging lens in Numerical Example 3 according to the embodiment of the present invention.
Figure 7:
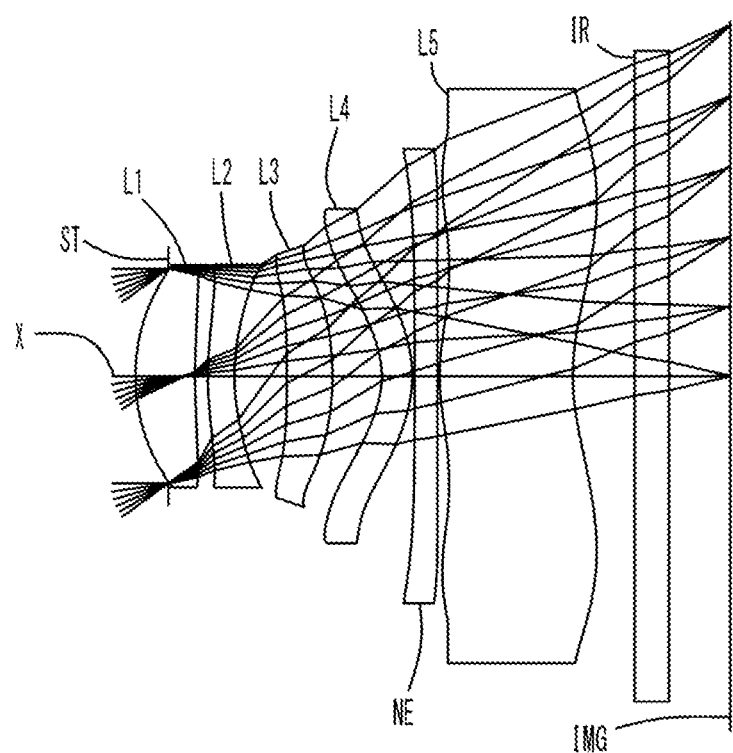
FIG. 7 is a schematic view showing the general configuration of an imaging lens in Numerical Example 4 according to the embodiment of the present invention.

FIG. 6 shows spherical aberration (mm), astigmatism (mm), and distortion (%) of the imaging lens in Numerical Example 3. As shown in FIG. 6, each aberration is corrected properly.

NUMERICAL EXAMPLE 4

The basic lens data of Numerical Example 4 is shown below.

| in mm |
|---|
| f = 4.16 |
| Fno = 2.2 |
| ω(°) = 36.0 |
| ih = 3.06 |

-continued

| in mm |
|---|
| TLA = 5.09 |
| bf = 1.27 |

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.286 | | |
| 2* | 1.650 | 0.521 | 1.544 | 55.57 (vd1) |
| 3* | 7.066 | 0.111 | | |
| 4* | 2.822 | 0.231 | 1.639 | 23.23 (vd2) |
| 5* | 1.779 | 0.458 | | |
| 6* | −17.526 | 0.398 | 1.544 | 55.57 (vd3) |
| 7* | −2.620 | 0.430 | | |
| 8* | −0.804 | 0.266 | 1.639 | 23.23 (vd4) |
| 9* | −1.180 | 0.020 | | |
| 10* | Infinity | 0.200 | 1.535 | 55.66 (vdN) |
| 11* | Infinity | 0.020 | | |
| 12* | 1.792 | 1.159 | 1.544 | 55.57 (vd5) |
| 13* | 1.864 | 0.540 | | |
| 14 | Infinity | 0.300 | 1.517 | 64.20 |
| 15 | Infinity | 0.535 | | |
| Image Plane | Infinity | | | |

Constituent Lens Data

| Lens | Start Surface | Focal Length |
|---|---|---|
| 1 | 2 | 3.828 |
| 2 | 4 | −8.245 |
| 3 | 6 | 5.611 |
| 4 | 8 | −5.458 |
| 5 | 12 | 12.799 |

Composite Focal Length

| Lens | |
|---|---|
| 1, 2 | 5.877 |
| 4, 5 | −7.536 |

Aspheric Surface Data

| | 2nd Surface | 3rd Surface | 4th Surface | 5th Surface | 6th Surface | 7th Surface |
|---|---|---|---|---|---|---|
| k | 0.000E+00 | −7.475E+00 | −2.094E+01 | −8.011E+00 | 0.000E+00 | 3.556E+00 |
| A4 | 3.354E−03 | −7.819E−02 | −1.256E−01 | −4.335E−03 | −1.037E−01 | −2.577E−02 |
| A6 | 3.470E−02 | 1.081E−01 | 1.128E−01 | 2.455E−02 | −3.601E−02 | −4.613E−02 |
| A8 | −5.526E−02 | −8.402E−02 | 1.636E−02 | 1.380E−01 | 4.126E−02 | 3.264E−02 |
| A10 | −3.851E−03 | −1.685E−02 | −1.433E−01 | −2.363E−01 | −3.437E−03 | 4.496E−02 |
| A12 | 9.690E−02 | 4.309E−02 | 4.470E−02 | 1.597E−01 | 2.051E−02 | −2.869E−03 |
| A14 | −7.427E−02 | −3.524E−02 | 2.068E−02 | −2.579E−02 | 6.025E−02 | 1.378E−03 |
| A16 | 0.000E+00 | 0.000E+00 | 0.000E+00 | 0.000E+00 | −4.566E−02 | 0.000E+00 |

| | 8th Surface | 9th Surface | 10th Surface | 11th Surface | 12th Surface | 13th Surface |
|---|---|---|---|---|---|---|
| k | −4.025E+00 | −7.240E−01 | 0.000E+00 | 0.000E+00 | −1.839E+01 | −8.627E+00 |
| A4 | −8.271E−02 | 1.085E−01 | −3.606E−03 | −2.031E−04 | −1.157E−01 | −4.818E−02 |
| A6 | −1.035E−02 | −3.412E−02 | −1.727E−03 | 6.968E−04 | 6.678E−02 | 1.854E−02 |
| A8 | 1.207E−01 | 2.249E−02 | 2.750E−04 | −2.901E−04 | −4.187E−02 | −7.614E−03 |
| A10 | −4.711E−02 | 9.528E−03 | 0.000E+00 | 0.000E+00 | 2.106E−02 | 2.170E−03 |
| A12 | −7.559E−03 | −3.216E−03 | 0.000E+00 | 0.000E+00 | −5.887E−03 | −3.844E−04 |
| A14 | 3.198E−03 | −2.665E−03 | 0.000E+00 | 0.000E+00 | 8.236E−04 | 3.819E−05 |
| A16 | 6.086E−04 | 7.748E−04 | 0.000E+00 | 0.000E+00 | −4.567E−05 | −1.593E−06 |

In this example, the aberration correction optical element NE as a double-sided aspheric element with virtually no refractive power is located between the fourth lens L4 and the fifth lens L5.

As shown in Table 1, the imaging lens in Numerical Example 4 satisfies all the conditional expressions (1) to (12).

Figure 8:
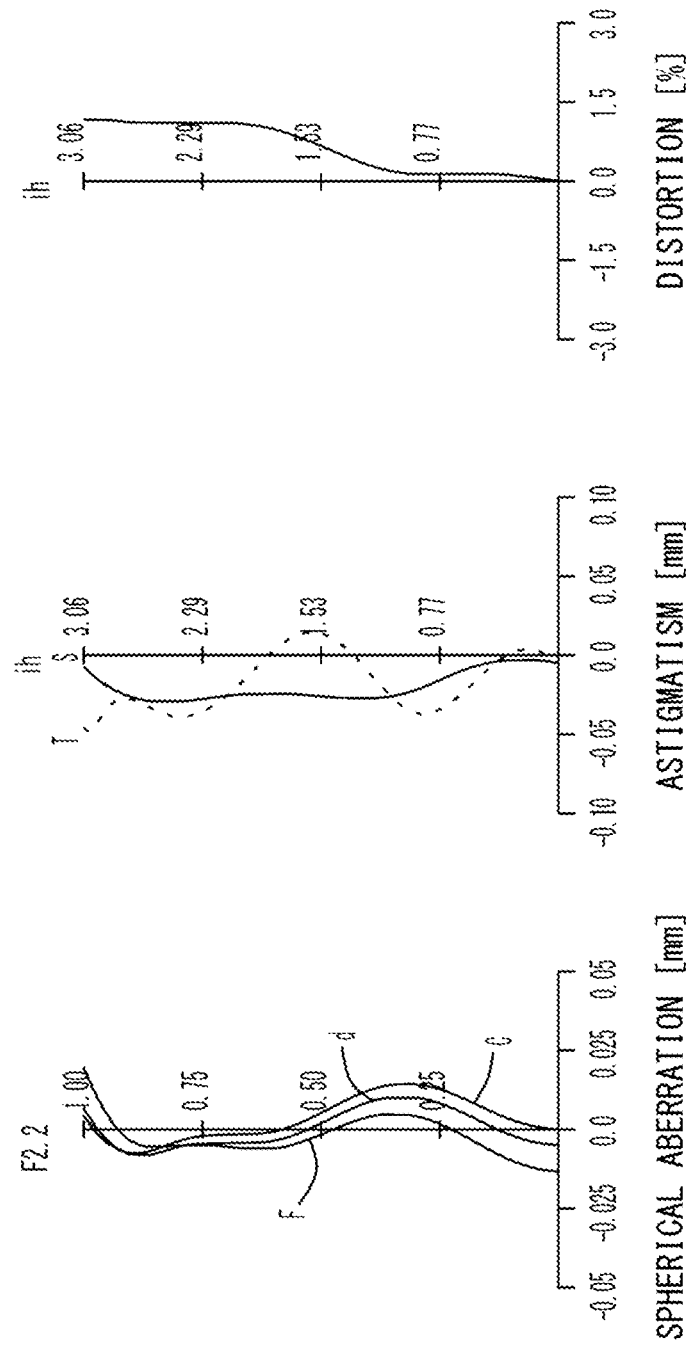
FIG. 8 shows spherical aberration, astigmatism, and distortion of the imaging lens in Numerical Example 4 according to the embodiment of the present invention.
Figure 9:
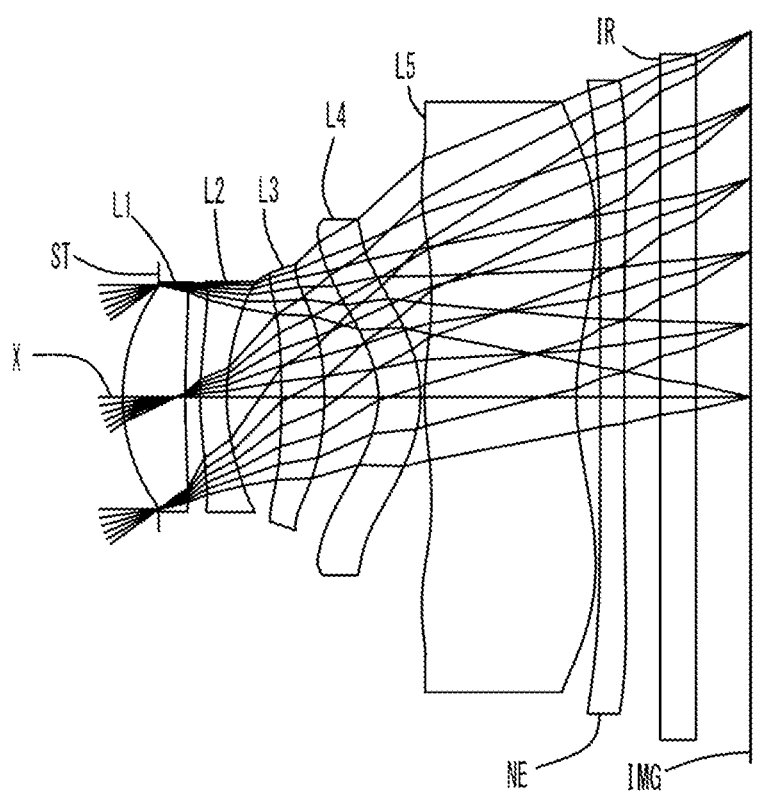
FIG. 9 is a schematic view showing the general configuration of an imaging lens in Numerical Example 5 according to the embodiment of the present invention.

FIG. 8 shows spherical aberration (mm), astigmatism (mm), and distortion (%) of the imaging lens in Numerical Example 4. As shown in FIG. 8, each aberration is corrected properly.

NUMERICAL EXAMPLE 5

The basic lens data of Numerical Example 5 is shown below.

| in mm |
| --- |
| f = 4.16 |
| Fno = 2.2 |
| ω(°) = 36.0 |
| ih = 3.06 |
| TLA = 5.14 |
| bf = 1.35 |

Surface Data

| Surface No. i | Curvature Radius r | Surface Distance d | Refractive Index Nd | Abbe Number νd |
| --- | --- | --- | --- | --- |
| (Object Surface) | Infinity | Infinity | | |
| 1 (Stop) | Infinity | −0.299 | | |
| 2* | 1.619 | 0.522 | 1.544 | 55.57 (νd1) |
| 3* | 7.865 | 0.126 | | |
| 4* | 2.737 | 0.220 | 1.639 | 23.23 (νd2) |
| 5* | 1.678 | 0.456 | | |
| 6* | −14.973 | 0.360 | 1.544 | 55.57 (νd3) |
| 7* | −2.552 | 0.453 | | |
| 8* | −0.805 | 0.351 | 1.639 | 23.23 (νd4) |
| 9* | −1.138 | 0.035 | | |
| 10* | 2.288 | 1.269 | 1.544 | 55.57 (νd5) |
| 11* | 2.188 | 0.200 | | |
| 12* | Infinity | 0.200 | 1.535 | 55.66 (νdN) |
| 13* | Infinity | 0.300 | | |
| 14 | Infinity | 0.300 | 1.517 | 64.20 |
| 15 | Infinity | 0.451 | | |
| Image Plane | Infinity | | | |

Constituent Lens Data

| Lens | Start Surface | Focal Length |
| --- | --- | --- |
| 1 | 2 | 3.642 |
| 2 | 4 | −7.380 |
| 3 | 6 | 5.600 |
| 4 | 8 | −7.288 |
| 5 | 10 | 26.587 |

Composite Focal Length

| Lens | |
| --- | --- |
| 1, 2 | 5.773 |
| 4, 5 | −8.261 |

Aspheric Surface Data

| | 2nd Surface | 3rd Surface | 4th Surface | 5th Surface | 6th Surface | 7th Surface |
| --- | --- | --- | --- | --- | --- | --- |
| k | 0.000E+00 | −1.592E+00 | −2.341E+01 | −7.960E+00 | 0.000E+00 | 3.448E+00 |
| A4 | 4.775E−03 | −7.694E−02 | −1.260E−01 | 2.184E−04 | −9.638E−02 | −2.532E−02 |
| A6 | 3.436E−02 | 1.107E−01 | 1.146E−01 | 2.768E−02 | −3.270E−02 | −3.623E−02 |
| A8 | −5.522E−02 | −7.825E−02 | 1.400E−02 | 1.371E−01 | 4.020E−02 | 3.471E−02 |
| A10 | 6.881E−05 | −1.783E−02 | −1.430E−01 | −2.416E−01 | −4.716E−03 | 4.440E−02 |
| A12 | 9.966E−02 | 4.318E−02 | 4.329E−02 | 1.558E−01 | 2.076E−02 | −1.989E−04 |
| A14 | −7.794E−02 | −3.982E−02 | 1.527E−02 | −2.441E−02 | 6.126E−02 | 1.857E−03 |
| A16 | 0.000E+00 | 0.000E+00 | 0.000E+00 | 0.000E+00 | −4.840E−02 | 0.000E+00 |

| | 8th Surface | 9th Surface | 10th Surface | 11th Surface | 12th Surface | 13th Surface |
| --- | --- | --- | --- | --- | --- | --- |
| k | −3.751E+00 | −7.262E−01 | −2.596E+01 | −1.041E+01 | 0.000E+00 | 0.000E+00 |
| A4 | −7.993E−02 | 1.167E−01 | −1.127E−01 | −4.821E−02 | −5.471E−04 | 3.600E−03 |
| A6 | −9.851E−03 | −3.821E−02 | 6.623E−02 | 1.759E−02 | −3.314E−04 | −6.680E−04 |
| A8 | 1.205E−01 | 2.258E−02 | −4.194E−02 | −7.469E−03 | −1.474E−05 | −1.517E−05 |
| A10 | −4.720E−02 | 9.711E−03 | 2.106E−02 | 2.171E−03 | 4.112E−06 | 3.031E−06 |
| A12 | −7.712E−03 | −3.071E−03 | −5.881E−03 | −3.860E−04 | 0.000E+00 | 0.000E+00 |
| A14 | 3.133E−03 | −2.652E−03 | 8.250E−04 | 3.810E−05 | 0.000E+00 | 0.000E+00 |
| A16 | 6.918E−04 | 7.605E−04 | −4.611E−05 | −1.572E−06 | 0.000E+00 | 0.000E+00 |

In this example, the aberration correction optical element NE as a double-sided aspheric element with virtually no refractive power is located between the fifth lens L5 and the image plane IMG.

As shown in Table 1, the imaging lens in Numerical Example 5 satisfies all the conditional expressions (1) to (12).

Figure 10:
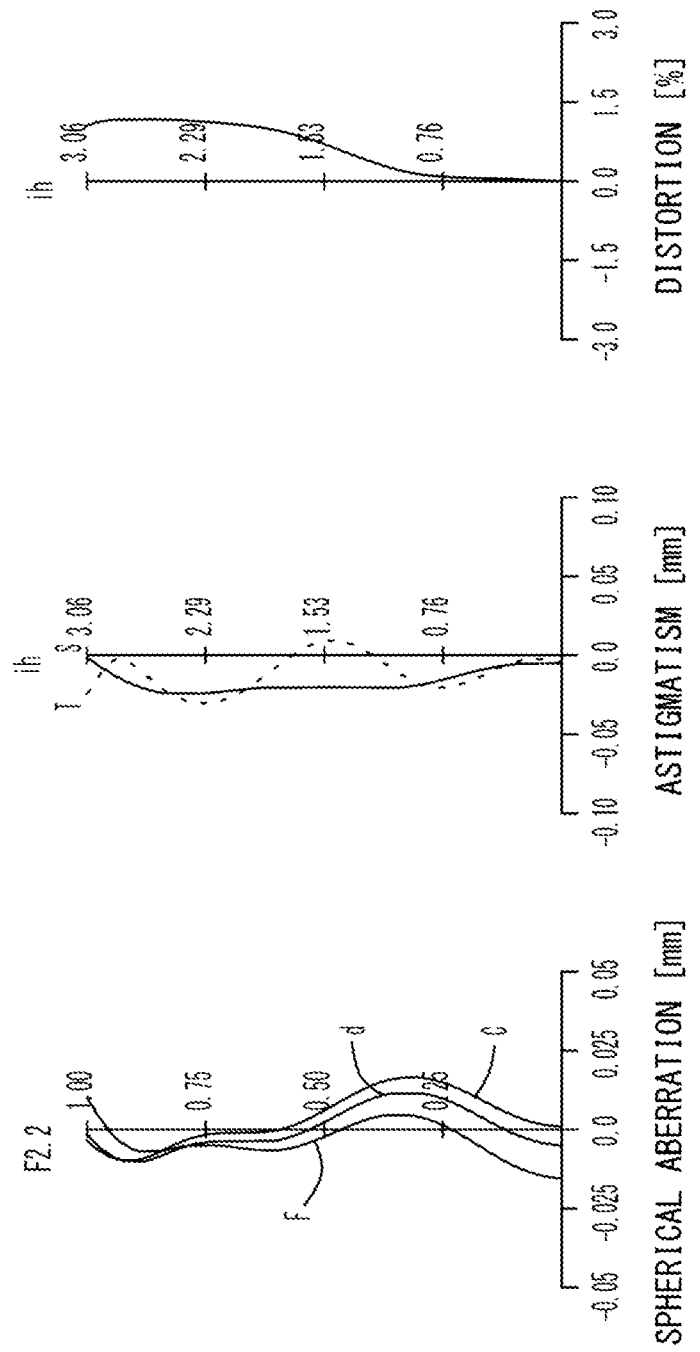
FIG. 10 shows spherical aberration, astigmatism, and distortion of the imaging lens in Numerical Example 5 according to the embodiment of the present invention.
Figure 11:
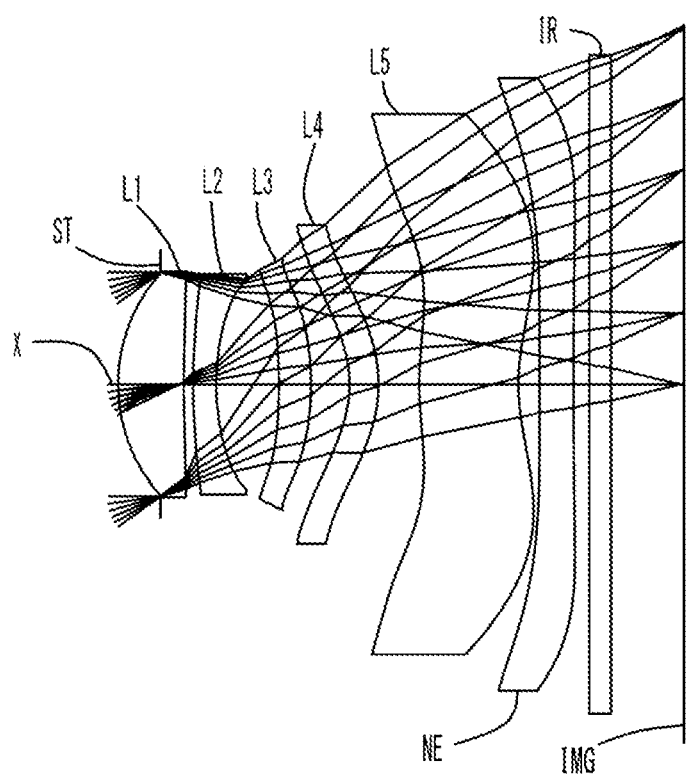
FIG. 11 is a schematic view showing the general configuration of an imaging lens in Numerical Example 6 according to the embodiment of the present invention.

FIG. 10 shows spherical aberration (mm), astigmatism (mm), and distortion (%) of the imaging lens in Numerical Example 5. As shown in FIG. 10, each aberration is corrected properly.

NUMERICAL EXAMPLE 6

The basic lens data of Numerical Example 6 is shown below.

| in mm |
|---|
| f = 4.71 |
| Fno = 2.2 |
| ω(°) = 35.7 |
| ih = 3.43 |
| TLA = 5.33 |
| bf = 1.51 |

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.390 | | |
| 2* | 1.614 | 0.628 | 1.544 | 55.57 (vd1) |
| 3* | 12.591 | 0.088 | | |
| 4* | 4.535 | 0.220 | 1.635 | 23.97 (vd2) |
| 5* | 2.161 | 0.599 | | |
| 6* | −6.796 | 0.307 | 1.544 | 55.57 (vd3) |
| 7* | −2.857 | 0.369 | | |
| 8* | −1.113 | 0.277 | 1.639 | 23.23 (vd4) |
| 9* | −1.335 | 0.389 | | |
| 10* | 3.017 | 0.948 | 1.544 | 55.57 (vd5) |
| 11* | 1.951 | 0.204 | | |
| 12* | Infinity | 0.322 | 1.535 | 55.66 (vdN) |
| 13* | Infinity | 0.115 | | |
| 14 | Infinity | 0.210 | 1.517 | 64.20 |
| 15 | Infinity | 0.729 | | |
| Image Plane | Infinity | | | |

Constituent Lens Data

| Lens | Start Surface | Focal Length |
|---|---|---|
| 1 | 2 | 3.337 |
| 2 | 4 | −6.743 |
| 3 | 6 | 8.820 |
| 4 | 8 | −20.382 |
| 5 | 10 | −14.801 |

Composite Focal Length

| Lens | |
|---|---|
| 1, 2 | 5.334 |
| 4, 5 | −7.526 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 2.474E+01 | −5.029E+01 | −8.615E+00 | 0.000E+00 | 2.349E+00 |
| A4 | 9.239E−04 | −5.801E−02 | −7.901E−02 | 2.753E−02 | −9.798E−02 | −2.487E−02 |
| A6 | 1.929E−02 | 5.650E−02 | 9.725E−02 | 5.177E−02 | −2.279E−02 | −4.689E−02 |
| A8 | −2.631E−02 | −1.450E−02 | 1.355E−02 | 7.271E−02 | 1.802E−02 | 5.196E−02 |
| A10 | −2.527E−03 | −8.675E−02 | −5.394E−02 | −1.021E−01 | 2.425E−02 | 0.000E+00 |
| A12 | 3.072E−02 | 1.080E−02 | 1.460E−02 | 5.637E−02 | −6.249E−03 | 0.000E+00 |
| A14 | −1.692E−02 | −8.963E−03 | 0.000E+00 | −2.927E−03 | 1.228E−02 | 0.000E+00 |
| A16 | 0.000E+00 | 0.000E+00 | 0.000E+00 | 0.000E+00 | −8.610E−03 | 0.000E+00 |

| | 8th Surface | 9th Surface | 10th Surface | 11th Surface | 12th Surface | 13th Surface |
|---|---|---|---|---|---|---|
| k | −4.092E+00 | −7.796E−01 | −2.627E+01 | −9.941E+00 | 0.000E+00 | 0.000E+00 |
| A4 | −2.818E−02 | 8.952E−02 | −1.046E−01 | −5.639E−02 | −7.612E−03 | 6.290E−03 |
| A6 | −2.885E−03 | −2.530E−02 | 3.896E−02 | 1.065E−02 | −1.015E−04 | −1.650E−03 |
| A8 | 4.449E−02 | 1.211E−02 | −1.860E−02 | −3.088E−03 | 4.157E−05 | −2.549E−06 |
| A10 | −1.898E−02 | 3.216E−03 | 7.501E−03 | 7.829E−04 | 1.265E−07 | 5.363E−06 |

-continued

| | | in mm | | | | |
|---|---|---|---|---|---|---|
| A12 | −1.577E−03 | −1.315E−03 | −1.659E−03 | −1.128E−04 | 0.000E+00 | 0.000E+00 |
| A14 | 1.383E−03 | −6.889E−04 | 1.834E−04 | 8.110E−06 | 0.000E+00 | 0.000E+00 |
| A16 | 0.000E+00 | 1.876E−04 | −8.133E−06 | −2.241E−07 | 0.000E+00 | 0.000E+00 |

In this example, the aberration correction optical element NE as a double-sided aspheric element with virtually no refractive power is located between the fifth lens L5 and the image plane IMG.

As shown in Table 1, the imaging lens in Numerical Example 6 satisfies all the conditional expressions (1) to (12).

Figure 12:
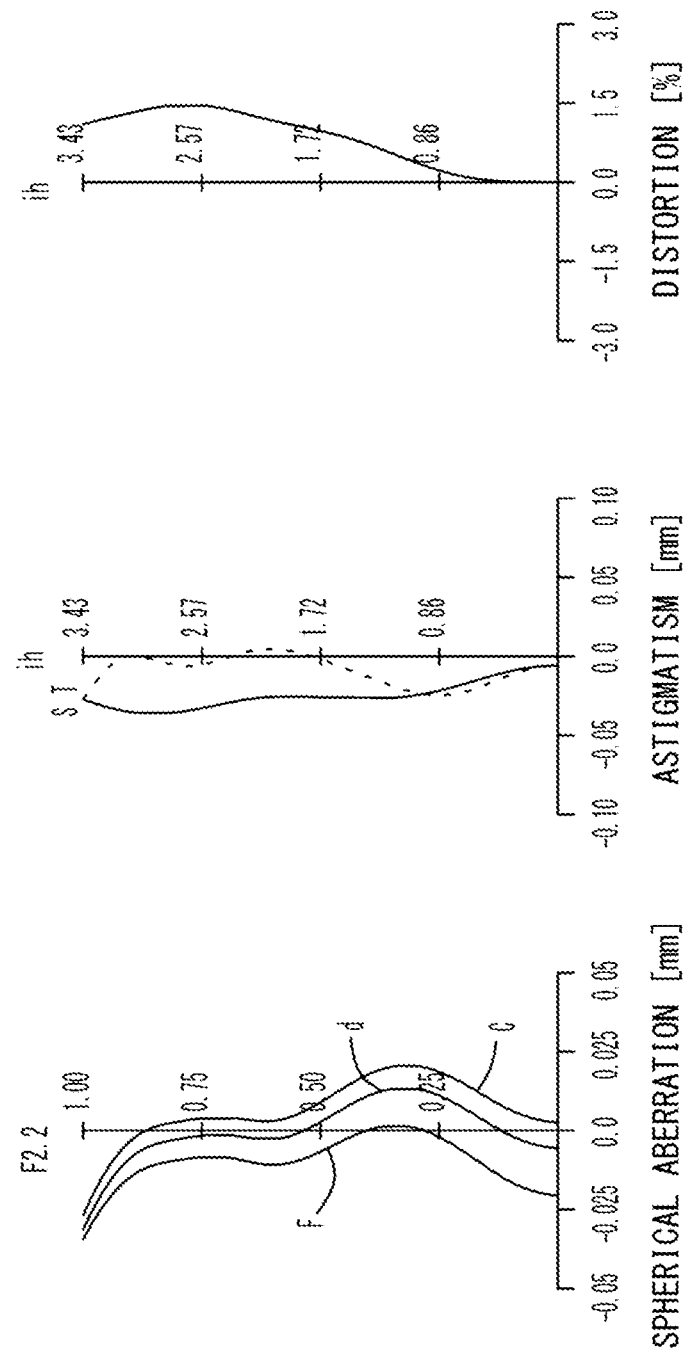
FIG. 12 shows spherical aberration, astigmatism, and distortion of the imaging lens in Numerical Example 6 according to the embodiment of the present invention.

FIG. 12 shows spherical aberration (mm), astigmatism (mm), and distortion (%) of the imaging lens in Numerical Example 6. As shown in FIG. 12, each aberration is corrected properly.

TABLE 1

| | Example 1 | Example 2 | Example 3 | Example 4 | Example 5 | Example 6 |
|---|---|---|---|---|---|---|
| 0.05 < TN/f < 0.5 | 0.07 | 0.17 | 0.16 | 0.06 | 0.35 | 0.34 |
| 0.03 < dN/f < 0.1 | 0.05 | 0.05 | 0.06 | 0.05 | 0.05 | 0.07 |
| 40 < vdN < 70 | 55.66 | 55.66 | 55.66 | 55.66 | 55.66 | 55.66 |
| 0.08 < T23/f < 0.2 | 0.11 | 0.17 | 0.10 | 0.11 | 0.11 | 0.13 |
| 0.03 < d2/f < 0.08 | 0.05 | 0.05 | 0.05 | 0.06 | 0.05 | 0.05 |
| 1.0 < f12/f < 1.6 | 1.33 | 1.38 | 1.46 | 1.41 | 1.39 | 1.13 |
| 1.0 < f3/f < 2.0 | 1.19 | 1.23 | 1.36 | 1.35 | 1.35 | 1.87 |
| −2.0 < f45/f < −1.2 | −1.38 | −1.47 | −1.99 | −1.81 | −1.98 | −1.60 |
| 2.5 < (r3 + r4)/(r3 − r4) < 5.0 | 3.63 | 4.25 | 4.02 | 4.41 | 4.17 | 2.82 |
| 20 < vd1 − vd2 < 40 | 31.60 | 32.34 | 32.34 | 32.34 | 32.34 | 31.60 |
| 20 < vd4 − vd3 < 40 | 29.99 | 32.34 | 32.34 | 32.34 | 32.34 | 32.34 |
| 40 < vd5 < 70 | 55.57 | 55.57 | 55.57 | 55.57 | 55.57 | 55.57 |

As explained above, the imaging lenses composed of six optical elements in the examples according to this embodiment of the present invention provide a compact optical system with a short total track length, though they use a total of six optical elements: five elements for an imaging lens and one element with virtually no refractive power for aberration correction. When the degree of low-profileness is expressed by the ratio of total track length TLA to maximum image height ih (TLA/2ih), the TLA/2ih of each of these imaging lenses is about 0.8. In addition, the imaging lenses offer a wide field of view of 70 degrees or more and brightness with an F-value of 2.4 or less, and correct various aberrations properly and can be manufactured at low cost.

When any one of the imaging lenses composed of six optical elements in the examples according to this embodiment of the present invention is used in the image pickup device mounted in an increasingly compact and low-profile mobile terminal such as a smartphone, mobile phone or PDA (Personal Digital Assistant), a game console, an information terminal such as a PC, or a home appliance with a camera function, it contributes to the compactness the image pickup device and provides high camera performance.

The effects of the present invention are as follows.

According to the present invention, there is provided a compact low-cost imaging lens which meets the demand for low-profileness, offers brightness with an F-value of 2.4 or less and a wide field of view, and corrects various aberrations properly.

What is claimed is:

1. An imaging lens composed of six optical elements which forms an image of an object on a solid-state image sensor, in which the elements are arranged in order from an object side to an image side, comprising:
a first lens with positive refractive power having a convex surface on the object side as a first optical element;
a second lens with negative refractive power having a concave surface on the image side as a second optical element;
a third lens with positive refractive power as a third optical element;
a fourth lens with negative refractive power as a double-sided aspheric lens having a convex surface on the image side as a fourth optical element; and
a fifth lens as a double-sided aspheric lens having a concave surface on the image side as a fifth optical element, wherein
as a sixth optical element, one aberration correction optical element as a double-sided aspheric element which has virtually no refractive power is located between the first lens and an image plane.

2. The imaging lens composed of six optical elements according to claim 1,
wherein the aberration correction optical element is located between the first lens and the second lens.

3. The imaging lens composed of six optical elements according to claim 1,
wherein the aberration correction optical element is located between the second lens and the third lens.

4. The imaging lens composed of six optical elements according to claim 1,
wherein the aberration correction optical element is located between the third lens and the fourth lens.

5. The imaging lens composed of six optical elements according to claim 1,
wherein the aberration correction optical element is located between the fourth lens and the fifth lens.

6. The imaging lens composed of six optical elements according to claim 1,
wherein the aberration correction optical element is located between the fifth lens and the image plane.

7. The imaging lens composed of six optical elements according to claim 1,
wherein conditional expressions (1) to (3) below are satisfied:

$$0.05<TN/f<0.5 \tag{1}$$

$$0.03<dN/f<0.1 \tag{2}$$

$$40<vdN<70 \tag{3}$$

where
TN: distance on an optical axis between lenses where the aberration correction optical element is located,
dN: thickness of the aberration correction optical element on the optical axis,
f: focal length of an overall optical system of the imaging lens, and
vdN: Abbe number of the aberration correction optical element at d-ray.

8. The imaging lens composed of six optical elements according to claim 1,
wherein the fifth lens is a meniscus lens having a concave surface on the image side which has the weakest positive or negative refractive power among the optical elements with refractive power, and the object-side and image-side surfaces of the fifth lens are aspheric surfaces with pole-change points off an optical axis.

9. The imaging lens composed of six optical elements according to claim 1,
wherein conditional expressions (4) and (5) below are satisfied:

$$0.08<T23/f<0.2 \tag{4}$$

$$0.03<d2/f<0.08 \tag{5}$$

where
T23: air gap on an optical axis between the second lens and the third lens,
d2: thickness of the second lens on the optical axis, and
f: focal length of an overall optical system of the imaging lens.

10. The imaging lens composed of six optical elements according to claim 1,
wherein a conditional expression (6) below is satisfied:

$$1.0<f12/f<1.6 \tag{6}$$

where
f12: composite focal length of the first lens and the second lens, and
f: focal length of an overall optical system of the imaging lens.

11. The imaging lens composed of six optical elements according to claim 1,
wherein a conditional expression (7) below is satisfied:

$$1.0<f3/f<2.0 \tag{7}$$

where
f3: focal length of the third lens, and
f: focal length of an overall optical system of the imaging lens.

12. The imaging lens composed of six optical elements according to claim 1,
wherein a conditional expression (8) below is satisfied:

$$-2.0<f45/f<-1.2 \tag{8}$$

where
f45: composite focal length of the fourth lens and the fifth lens, and
f: focal length of an overall optical system of the imaging lens.

13. The imaging lens composed of six optical elements according to claim 1,
wherein a conditional expression (9) below is satisfied:

$$2.5<(r3+r4)/(r3-r4)<5.0 \tag{9}$$

where
r3: curvature radius of the object-side surface of the second lens, and
r4: curvature radius of the image-side surface of the second lens.

14. The imaging lens composed of six optical elements according to claim 1,
wherein conditional expressions (10) to (12) below are satisfied:

$$20<vd1-vd2<40 \tag{10}$$

$$20<vd4-vd3<40 \tag{11}$$

$$40<vd5<70 \tag{12}$$

where
vd1: Abbe number of the first lens at d-ray,
vd2: Abbe number of the second lens at d-ray,
vd3: Abbe number of the third lens at d-ray,
vd4: Abbe number of the fourth lens at d-ray, and
vd5: Abbe number of the fifth lens at d-ray.

15. The imaging lens composed of six optical elements according to claim 7,
wherein the fifth lens is a meniscus lens having a concave surface on the image side which has the weakest positive or negative refractive power among the optical elements with refractive power, and the object-side and image-side surfaces of the fifth lens are aspheric surfaces with pole-change points off an optical axis.

16. The imaging lens composed of six optical elements according to claim 7,
wherein conditional expressions (4) and (5) below are satisfied:

$$0.08<T23/f<0.2 \tag{4}$$

$$0.03<d2/f<0.08 \tag{5}$$

where
T23: air gap on an optical axis between the second lens and the third lens,
d2: thickness of the second lens on the optical axis, and
f: focal length of an overall optical system of the imaging lens.

17. The imaging lens composed of six optical elements according to claim 7,
wherein a conditional expression (6) below is satisfied:

$$1.0<f12/f<1.6 \tag{6}$$

where
f12: composite focal length of the first lens and the second lens, and
f: focal length of an overall optical system of the imaging lens.

18. The imaging lens composed of six optical elements according to claim 10,
wherein a conditional expression (7) below is satisfied:

$$1.0<f3/f<2.0 \tag{7}$$

where f3: focal length of the third lens, and f: focal length of an overall optical system of the imaging lens.

19. The imaging lens composed of six optical elements according to claim 11, wherein a conditional expression (8) below is satisfied:

$$-2.0<f45/f<-1.2 \tag{8}$$

where f45: composite focal length of the fourth lens and the fifth lens, and f: focal length of an overall optical system of the imaging lens.

20. The imaging lens composed of six optical elements according to claim 7, wherein a conditional expression (9) below is satisfied:

$$2.5<(r3+r4)/(r3-r4)<5.0 \tag{9}$$

where r3: curvature radius of the object-side surface of the second lens, and r4: curvature radius of the image-side surface of the second lens.

21. The imaging lens composed of six optical elements according to claim 7, wherein conditional expressions (10) to (12) below are satisfied:

$$20<vd1-vd2<40 \tag{10}$$

$$20<vd4-vd3<40 \tag{11}$$

$$40<vd5<70 \tag{12}$$

where vd1: Abbe number of the first lens at d-ray, vd2: Abbe number of the second lens at d-ray, vd3: Abbe number of the third lens at d-ray, vd4: Abbe number of the fourth lens at d-ray, and vd5: Abbe number of the fifth lens at d-ray.

22. The imaging lens composed of six optical elements according to claim 17, wherein a conditional expression (7) below is satisfied:

$$1.0<f3/f<2.0 \tag{7}$$

where f3: focal length of the third lens, and f: focal length of an overall optical system of the imaging lens.

23. The imaging lens composed of six optical elements according to claim 18, wherein a conditional expression (8) below is satisfied:

$$-2.0<f45/f<-1.2 \tag{8}$$

where f45: composite focal length of the fourth lens and the fifth lens, and f: focal length of an overall optical system of the imaging lens.

24. The imaging lens composed of six optical elements according to claim 22, wherein a conditional expression (8) below is satisfied:

$$-2.0<f45/f<-1.2 \tag{8}$$

where f45: composite focal length of the fourth lens and the fifth lens, and f: focal length of an overall optical system of the imaging lens.

* * * * *